United States Patent
Wildschek et al.

(10) Patent No.: US 9,446,837 B2
(45) Date of Patent: Sep. 20, 2016

(54) METHOD AND APPARATUS FOR MINIMIZING DYNAMIC STRUCTURAL LOADS OF AN AIRCRAFT

(75) Inventors: Andreas Wildschek, Riemerling (DE); Tomas Hanis, Vysocany (CZ)

(73) Assignee: EADS Deutschland GmbH, Ottobrunn (DE)

( * ) Notice: Subject to any disclaimer, the term of this patent is extended or adjusted under 35 U.S.C. 154(b) by 284 days.

(21) Appl. No.: 14/235,238

(22) PCT Filed: Jul. 20, 2012

(86) PCT No.: PCT/EP2012/064311
§ 371 (c)(1),
(2), (4) Date: Sep. 10, 2014

(87) PCT Pub. No.: WO2013/014086
PCT Pub. Date: Jan. 31, 2013

(65) Prior Publication Data
US 2015/0021443 A1    Jan. 22, 2015

(30) Foreign Application Priority Data

Jul. 28, 2011   (EP) .................................. 11175857

(51) Int. Cl.
*B64C 13/16*   (2006.01)
*G05D 1/00*    (2006.01)
(Continued)

(52) U.S. Cl.
CPC ............. *B64C 13/16* (2013.01); *B64D 45/00* (2013.01); *G05D 1/00* (2013.01); *G05D 1/0066* (2013.01); *G05D 1/0623* (2013.01)

(58) Field of Classification Search
CPC ...... G05D 1/00; G05D 1/046; G05D 1/0615; G05D 1/0204; G05D 19/00; B64C 13/16; B64C 13/18; B64C 13/20; B64C 13/22; B64C 2700/6264; B64D 45/00

USPC ............... 701/3, 4, 7, 10, 11, 12; 244/173.1, 244/173.2

See application file for complete search history.

(56) References Cited

U.S. PATENT DOCUMENTS

| 4,796,192 A | * | 1/1989 | Lewis | ..................... B64C 13/16 244/76 R |
| 4,821,981 A | * | 4/1989 | Gangsaas | ............. G05D 1/0623 244/191 |

(Continued)

FOREIGN PATENT DOCUMENTS

| DE | 198 41 632 C2 | 3/2000 |
| DE | 10 2008 014 236 A1 | 9/2009 |

(Continued)

OTHER PUBLICATIONS

International Search Report dated Nov. 7, 2012 (Five (5) pages).

(Continued)

*Primary Examiner* — Thomas G Black
*Assistant Examiner* — Sara Lewandroski
(74) *Attorney, Agent, or Firm* — Crowell & Moring LLP (57) ABSTRACT

A method for dynamically alleviating loads generated on an aircraft by a disturbance of gust involves automatically detecting a disturbance due to gust on a flight of the aircraft. When a disturbance due to gust is detected, control commands for control surfaces are automatically generated and the control commands are applied to actuate the control surfaces. The method also involves dynamically actuating the control surfaces in a prescribed dynamic way in order to minimize not only a first load peak but also at least a second load peak.

10 Claims, 8 Drawing Sheets (51) Int. Cl.
  *B64D 45/00* (2006.01)
  *G05D 1/06* (2006.01)

(56) References Cited

U.S. PATENT DOCUMENTS

| | | | | |
|---|---|---|---|---|
| 4,829,220 A * | 5/1989 | Fabre | G05D 1/0607 | 318/563 |
| 4,905,934 A * | 3/1990 | Chin | G05D 1/0623 | 244/191 |
| 5,082,207 A * | 1/1992 | Tulinius | B64C 3/44 | 244/195 |
| 5,186,416 A * | 2/1993 | Fabre | G05D 1/0066 | 244/191 |
| 5,375,793 A * | 12/1994 | Rivron | B64C 9/12 | 244/184 |
| 5,375,794 A | 12/1994 | Bleeg | | |
| 5,995,880 A * | 11/1999 | Larramendy | G05D 1/0623 | 244/181 |
| 6,044,311 A * | 3/2000 | Larramendy | G05D 1/0615 | 244/175 |
| 6,161,801 A * | 12/2000 | Kelm | B64C 13/16 | 244/195 |
| 6,416,017 B1 * | 7/2002 | Becker | B64C 13/16 | 244/194 |
| 7,900,877 B1 * | 3/2011 | Guida | B64C 23/065 | 244/199.4 |
| 8,255,096 B2 | 8/2012 | Wildschek et al. | | |
| 9,221,555 B2 * | 12/2015 | Hinnant, Jr. | B64D 45/00 | |
| 2003/0205644 A1 * | 11/2003 | Najmabadi | B64C 13/16 | 244/195 |
| 2004/0079835 A1 * | 4/2004 | Volk | B64C 9/22 | 244/76 C |
| 2007/0018054 A1 * | 1/2007 | Enzinger | B64C 13/16 | 244/195 |
| 2007/0114327 A1 * | 5/2007 | Dees | B64C 9/323 | 244/34 R |
| 2008/0046137 A1 * | 2/2008 | Shue | B64C 13/16 | 701/10 |
| 2008/0265104 A1 | 10/2008 | Fabre-Raimbault et al. | | |
| 2009/0048723 A1 * | 2/2009 | Nugent | B64C 13/16 | 701/10 |
| 2009/0084908 A1 * | 4/2009 | Wildschek | G05D 1/0066 | 244/76 R |
| 2009/0132104 A1 * | 5/2009 | Rupnik | G05D 1/0623 | 701/6 |
| 2009/0157239 A1 * | 6/2009 | Walton | G05D 1/046 | 701/6 |
| 2009/0292405 A1 * | 11/2009 | Najmabadi | B64C 13/16 | 701/3 |
| 2010/0044518 A1 * | 2/2010 | Fleddermann | B64C 13/16 | 244/194 |
| 2010/0078518 A1 * | 4/2010 | Tran | B64C 13/16 | 244/87 |
| 2010/0171002 A1 * | 7/2010 | Hahn | G05D 1/0816 | 244/76 C |
| 2011/0172853 A1 * | 7/2011 | Jenaro Rabadan | G05D 1/0615 | 701/3 |
| 2011/0272532 A1 * | 11/2011 | Matsuda | B64C 9/10 | 244/215 |
| 2012/0025033 A1 * | 2/2012 | Huynh | B64C 13/503 | 244/76 R |
| 2012/0116611 A1 * | 5/2012 | Westphal | G05D 1/0808 | 701/3 |
| 2012/0187251 A1 * | 7/2012 | Guida | B64C 23/065 | 244/199.4 |
| 2012/0310449 A1 * | 12/2012 | Hinnant, Jr. | B64D 45/00 | 701/3 |
| 2013/0187009 A1 * | 7/2013 | Golling | B64C 21/04 | 244/203 |
| 2013/0206916 A1 * | 8/2013 | Kordt | B64C 9/34 | 244/203 |

FOREIGN PATENT DOCUMENTS

| | | |
|---|---|---|
| EP | 0 488 428 A2 | 6/1992 |
| EP | 1 814 006 A1 | 8/2007 |
| EP | 1 854 717 B1 | 11/2007 |

OTHER PUBLICATIONS

European Search Report dated Apr. 11, 2012 (Four (4) pages).
Written Opinion dated Nov. 7, 2012 (Six (6) pages).

* cited by examiner

METHOD AND APPARATUS FOR MINIMIZING DYNAMIC STRUCTURAL LOADS OF AN AIRCRAFT

BACKGROUND AND SUMMARY OF THE INVENTION

Exemplary embodiments of the present invention relate to minimizing dynamic structural loads of an aircraft, which are introduced by an external excitation to the aircraft.

Dynamic structural loads are introduced to the structure of an aircraft by external excitations, e.g. due to wind, gusts, turbulences or similar influences, and by excitations due to pilot/flight control system demands. As a result of the flexible properties of the aircraft structure, such excitation may result in oscillations or vibrations that may exceed a given magnitude, so that they can be harmful to the aircraft structure, especially of frequencies in the range of natural or characteristic oscillations of the flexible aircraft structure. If it is desired to reduce the mass of the aircraft structure at high aspect ratio of wing and fuselage, it is necessary to take measures against excessive dynamic structural loads.

Atmospheric gusts excite dynamic wing loads especially in the wing roots as well as vertical accelerations critical for passenger safety. Besides maneuver loads these loads are sizing for the aircraft structure. If it is possible to reduce the loads, then a lighter wing design is possible, thereby improving fuel efficiency and reducing direct operating costs. Another advantage is the increase of passenger safety due to alleviation of vertical accelerations.

German patent document DE 198 41 632 C2 discloses a method for compensating structural oscillations of an aircraft, which are introduced by an external excitation, comprising detecting at least one body rate of the aircraft with a sensor arrangement, providing the at least one body rate to a flight controller, and producing movements of control surfaces of the aircraft to minimize the excited oscillations.

For updraft gust the first load peak can be eliminated by a rapid deflection of spoilers on the upper wing surface, see U.S. patent document US 2008/0265104 A. This approach is limited by control authority (reaction time, actuator power), by the loads that the rapid spoiler deflection introduces to the wing structure, as well as by the constraint that the second peak of the wing bending acceleration must not be increased by the spoiler deflection.

European patent document EP 1 814 006 A1 proposes the symmetric actuation of ailerons for gust load alleviation using a high pass filtered alpha probe signal as reference for the gust and an adaptive feed-forward controller. This approach solves the problems mentioned above, but is even more limited by the control authority of the ailerons.

Further apparatuses and methods for reducing vibrations due to gust are disclosed in German patent document DE 10 2008 014 236 A1 and European patent document EP 1 854 717 A1. European patent document EP 1 854 717 A1 discloses how control commands for alleviating disturbances can be generated. German patent document DE 10 2008 014 236 A1 describes an apparatus and a method for adaptive control.

The method disclosed in U.S. patent document US 2008/0265104 is considered as the closest prior art. Therein, it is suggested to just deflect spoilers (and other control surfaces respectively) for some prescribed time in order to compensate the gust loads, and then close them again. Such spoiler deflection excites the first wing bending mode (among other flexible modes). The deflection (and thus the load alleviation) is thus restricted by the second load peak.

Exemplary embodiments of the present invention provide an optimized method and apparatus for alleviation of dynamic structural loads on aircraft due to gust.

According to one aspect of the invention, the control surfaces are not just deflected, but actuated in a prescribed dynamic way in order to minimize not only the first load peak but also at least one subsequent peak.

Preferably, the first and all subsequent load peaks are minimized by the prescribed dynamic actuation of the control surfaces.

Preferably, this dynamic actuation can be triggered by an alpha probe or by vertical acceleration measurement, by LIDAR or by any combination of those.

Compared to the prior art as disclosed in U.S. patent document US 2008/0265104, the invention and/or the preferred embodiments thereof provide the advantage that the spoilers and/or other control surfaces are not just deflected and retracted after a certain prescribed time but opened and closed in a prescribed dynamic way. Thereby, the control authority of the spoilers is fully exploited.

According to a preferred embodiment, also for downdraft gusts, a delayed spoiler deflection alleviates the first positive peak of the wing bending.

An advantage of an embodiment of the invention is that peak loads, i.e. first peak and subsequent peaks induced by strong gust can be optimally alleviated, for updraft as well as for downdraft gusts with the available control authority and/or actuator bandwidth.

According to one aspect, the invention provides a method of dynamically alleviating loads generated on an aircraft by a disturbance of gust, the method comprising the steps of:

automatically detecting a disturbance due to gust on a flight of the aircraft;

when a disturbance due to gust is detected, automatically generating control commands for control surfaces; and applying the control commands to actuate the control surfaces; wherein the method further comprises: dynamically actuating the control surfaces in a prescribed dynamic way in order to minimize not only a first load peak but also at least a second load peak.

In a preferred embodiment, the method further comprises: generating control commands using a predetermined control command sequence that has been pre-determined in a previous control command sequence determining step.

It is further preferred that the control command sequence determining step comprises: determining an optimized control command sequence in a convex synthesis.

Preferably, the control command sequence determining step comprises:

determining a load response of the aircraft in response to an actuation of the control surface according to a basis function $H_i$, modeling the control command sequence as a linear combination of basis functions in the form of $$H = \sum_{i=1}^{n} \theta_i \cdot H_i$$

wherein $\theta_i$ represents the $i^{th}$ element of a vector of variable $\theta$, simulation a typical wind gust shape being alleviated by the control command sequence H, and determining the vector of variable $\theta$ by optimization calculation such that the load response to the typical wind gust shape is minimized.

According to an advantageous embodiment, the basis function is an impulse function and the load response is a load response in response to an impulse.

It is preferred that the optimization is performed over discrete time series, wherein $H_i$ represents the basis function for the discrete time $t_i$ of a series of discrete times $t_1 \ldots t_i \ldots t_n$.

According to a preferred embodiment, the method further comprises:

storing the control command sequence determined in the control command sequence determining step in a memory device, wherein the step of generating the control commands comprises reading out the memory device for generating the predetermined control command sequence.

Preferably the control commands are at least one element of the following group of control commands: elevator control commands for actuating an elevator control surface, spoiler control commands for deflecting spoiler control surfaces arranged on an upper and/or lower surface of a wing of the aircraft, and aileron control commands for actuating an aileron control surface.

According to a further aspect, the invention provides an apparatus for dynamically alleviating loads generated on an aircraft by a disturbance of gust, comprising: monitoring means for automatically detecting a disturbance due to gust; control command generating means for automatically generating control commands for an actuating of control surfaces when the disturbance due to gust is detected; wherein the control command generating means is configured to dynamically actuate the control surfaces in a prescribed dynamic way in order to minimize not only a first load peak but also at least a second load peak.

It is preferred that the control command generating means comprises a memory device containing a predetermined control command sequence.

According to a further aspect, the invention provides a control command sequence determining device for determining a control command sequence to be used as control commands in an apparatus as mentioned before, the device comprising: load response determining means configured to determine a load response of the aircraft in response to an actuation of the control surface according to a basis function $H_i$, modeling means configured to model the control command sequence as a linear combination of basis functions in the form of $$H = \sum_{i=1}^{n} \theta_i \cdot H_i$$

wherein $\theta_i$ the $i^{th}$ element of a vector of variable $\theta$, gust simulation means configured to simulate a typical wind gust shape being alleviated by the control command sequence H, and variable vector determining means configured determine the vector of variable $\theta$ by optimization calculation such that the load response to the typical wind gust shape is minimized.

It is preferred that the load response determining means is configured to use an impulse function as the basis function and is configured to determine a load response in response to an impulse.

It is further preferred that the device is configured to calculate the optimization over discrete time series, wherein $H_i$ represents the basis function for the discrete time $t_i$ of a series of discrete times $t_1 \ldots t_i \ldots t_n$.

According to one embodiment of the invention, the strength of the disturbance is determined using the methods as known from U.S. patent document US 2008/0265104 A1 and/or European patent document EP 1 814 006 A1. It is preferred that the strength of the disturbance is determined using the angle of wind attack.

According to a preferred embodiment, the invention provides a triggered L-infinity optimal gust load alleviation.

BRIEF DESCRIPTION OF THE DRAWING FIGURES

Embodiments of the invention will now be described with reference to the appended drawings.

DETAILED DESCRIPTION

Figure 1:
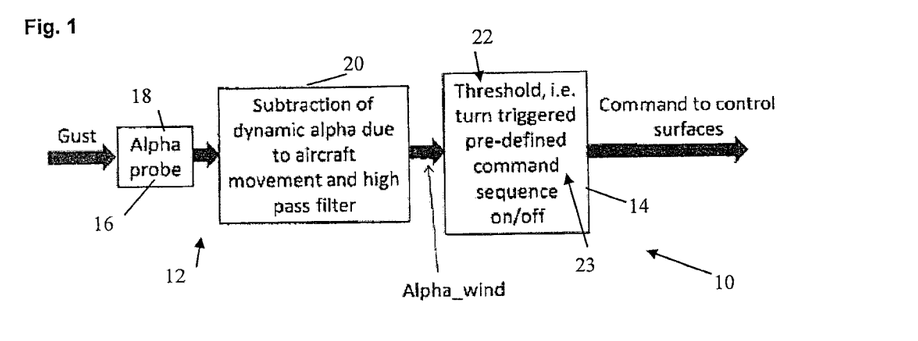
FIG. 1 shows an embodiment of a gust load alleviation apparatus forming an embodiment of an apparatus according to the invention.

FIG. 1 shows a block diagram of a gust load alleviation apparatus 10 which is an apparatus for dynamically alleviation loads generated on an aircraft by a disturbance of wind or gusts. The apparatus 10 comprises monitoring means 12 for automatically detecting a disturbance due to gust and a control command generating means 14 for automatically generating control commands for actuating control surfaces in response to a detection of a gust.

The monitoring means 12 comprises a reference sensor 16 and excitation identification means 20 configured to compute from a reference sensor signal a parameter $\alpha_{wind}$ that can be used for detection of a gust.

The reference sensor 16 can comprise an alpha probe 18, a vertical acceleration measurement means (not shown), a LIDAR device (not shown) or combination of those.

Regarding the excitation identification by the reference sensor 16, it is should be noted that European patent document EP 1 854 717 A1 explains how $\alpha_{wind}$ can be computed from the alpha probe measurement, which is also discussed in U.S. patent document US 2008/0265104.

Thus, the measurable angle of attack at the alpha probe mounting position $\alpha_{air}$, (i.e. the angle between the aircraft, and the velocity vector of the airflow) can be split up into:

$$\alpha_{air} = \alpha_{wind} + \alpha_0 + \alpha_{ground} = \alpha_{wind} + \alpha_0 + \alpha_{ground_{OL}} + \alpha_{ground_{CL}} \qquad \text{Eq. (1)}$$

Thereby, $\alpha_0$ denotes the static angle of attack of the trimmed aircraft in a ground reference system. The static angle of attack $\alpha_0$ can easily be erased by a high-pass filter. The alpha probe mounting node's angle of attack deviation from this static value $\alpha_0$ in a ground reference system is denoted $\alpha_{ground}$. The feed-forward GLAS (GLAS is an abbreviation of gust load alleviation system) however requires $\alpha_{wind}$ as reference signal. So $\alpha_{ground}$ needs to be subtracted from the measured $\alpha_{air}$ in order to get the required $\alpha_{wind}$. In order to compute $\alpha_{ground}$ mainly pitch rate and vertical speed are required.

The formula of European patent document EP 1 854 717 A1 for $\alpha_{wind}$ is:

$$\alpha_{wind} = \cos(\Phi)\left[\arcsin\left(\frac{\dot{H}}{VTAS}\right) - \Theta + \cos(\Phi)\cdot\left(\alpha_{air} + \frac{q\cdot r_{AoA}}{VTAS}\right) + \sin(\Phi)\cdot\left(\beta - \frac{r\cdot r_{AoS}}{VTAS}\right)\right] \qquad \text{Eq. (2)}$$

Thereby, $\Phi$ is the bank angle, $\dot{H}$ is the aircraft's inertial vertical speed, VTAS is the flight velocity of the aircraft with regard to the surrounding air, $\Theta$ is the pitch angle, $\alpha_{air}$ is the measured angle of attack, $\beta$ is the sideslip angle, r is the yaw rate, $r_{AoA}$, and $r_{AoS}$ are the distances from the center of gravity to the alpha and to the beta sensor respectively. For further details and explanation, the interested reader should refer to European patent document EP 1 854 717 A1.

The control command generation means 14 includes a comparing means 22 configured to compare the present signal of $\alpha_{wind}$ with a predetermined threshold to detect a gust and to trigger generation of control commands when $\alpha_{wind}$ exceeds such threshold.

Further, the control command generation means 14 comprises a memory device 23 that contains different predetermined command sequences 24, 26 for different control surfaces.

Figure 2:
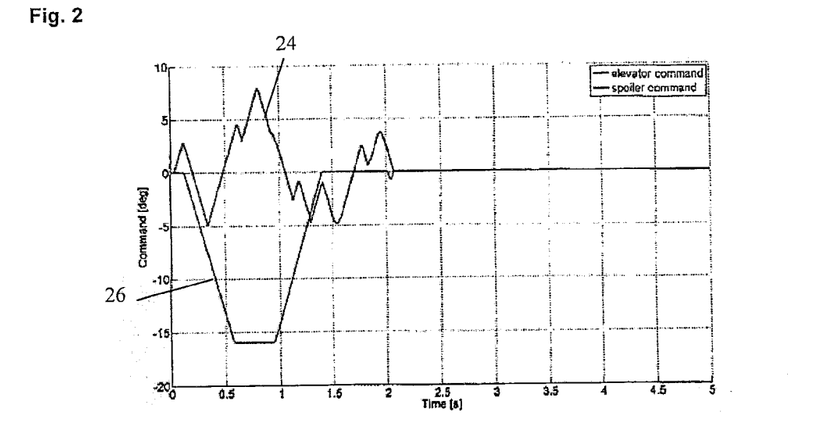
FIG. 2 shows examples of predetermined control command sequences for elevator commands and spoiler commands used as control commands in the apparatus of FIG. 1.

FIG. 2 shows examples of predetermined command sequences 24, 26 for elevator command signals and for spoiler command signals.

As illustrated, the predetermined elevator command sequence 24 has a predetermined signal curve for the elevator command signal so that the elevator is actuated in a predetermined dynamical way.

Further, there is provided a predetermined spoiler command sequence 26 for a spoiler command signal that is in the form of a predetermined command signal curve so that spoilers are deflected in a dynamic predetermined way.

In the present example of the spoiler command sequence 26, there is a first large signal peak starting at approximately 0.2 s and lasting to approximately 0.6 s. Thereafter, the spoilers are closed again wherein the closing starts at a time of ca. 0.9 s so that the spoilers are fully closed again at a time of approximately 1.4 s. Thereafter, there is a short command signal peak at the time of approximately 2 s to 2.1 s.

Referring again to FIG. 1, there is shown that the control command generation means 14 outputs the predetermined control command sequences 24, 26 and sends them as control commands to the control surfaces. Thus, the control surfaces (not shown) are actuated in a predefined dynamic way to alleviate loads excited by the gust. For example, wing root bending moments and/or wing root torques are alleviated in an optimized dynamic way so that not only the absolute value of a first load peak but also the absolute value of at least a subsequent second load peak is minimized.

Preferably, the L infinity norm of the corresponding time signal is minimized, which means that the maximum of the absolute value of signal is minimized.

Figure 3:
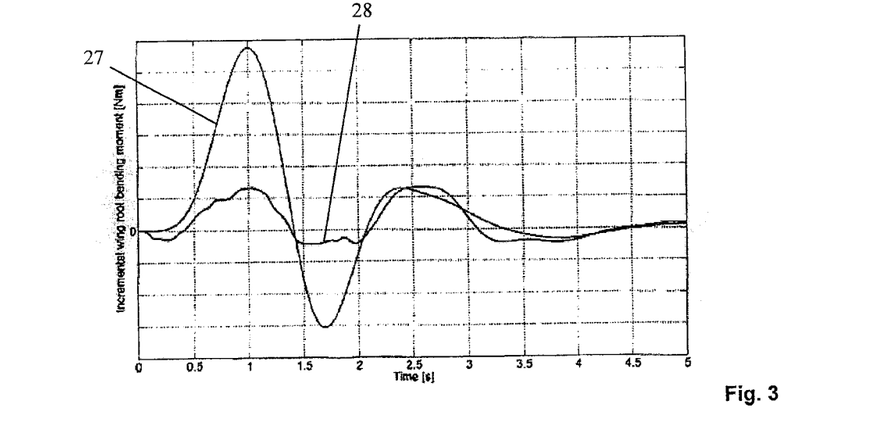
FIG. 3 shows a graph for an incremental wing root bending moment over time in response to a gust without gust load alleviation and with gust load alleviation.

FIG. 3 shows a graph of incremental wing root bending moment over the time in response to a gust, wherein a first line 27 shows the incremental wing root bending moment in response to a gust without gust load alleviation while a second line 28 shows the incremental wing root bending moment with gust load alleviation.

It is to be noted from FIG. 3 that by applying the predetermined control command sequences 24, 26 for elevator command signal and spoiler command signal, both the first load peak as well as the second (negative) load peak is alleviated.

In the following, an example procedure and an example device for the determination of the predetermined control command sequences 24, 26 are explained with reference to FIGS. 4 to 17.

Figure 4:
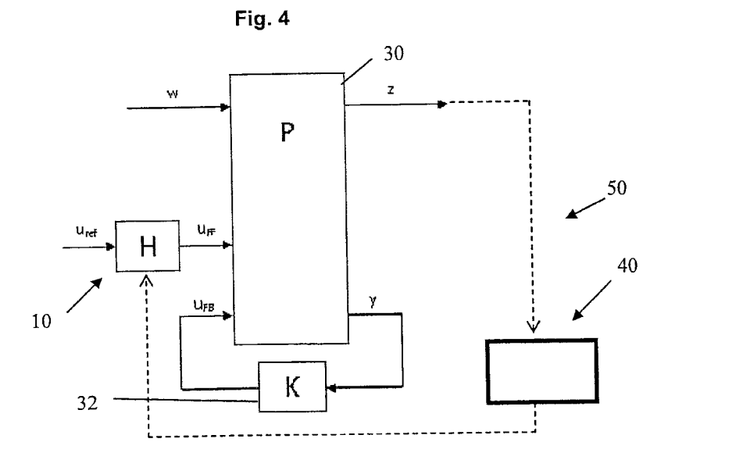
FIG. 4 shows a block diagram representing a general augmented plant plot for feedback and feed-forward control laws defining input signals and output signals.

FIG. 4 shows a block diagram for a convex synthesis of an augmented plant P. The augmented plant P is given as a model (e.g. computer model for simulation) and definition of input and output signals are provided.

In this block diagram, the following notation is used:
P represents the augmented plant to be optimized in a convex synthesis,
w represents exogenous inputs,
z represents the output to be regulated,
H represents a feed-forward control law,
$U_{ref}$ represents reference inputs,
$U_{FF}$ represents actuator feed-forward inputs,
y represents sensed outputs,
K represents a feedback control law,
$U_{FB}$ represents actuator feedback inputs.

This general plot as given in FIG. 4 is especially used to find the optimized feed-forward control law such that regulated outputs time signals are minimized. This can be done by convex optimization.

In a practical example, the control law is expressed as linear combination of basis functions according to the following equitation (3):

$$H(s) = \sum_{i=1}^{n} \theta_i \cdot H_i(s),\qquad\text{Eq. (3)}$$

wherein
H(s) represents the Laplace transformation of the feed-forward control law H;
$H_i(s)$ represents the Laplace transformation of feed-forward control law $i^{th}$ basis function;
θ represents a vector of variable (to be determined by optimization);
$\theta_i$ represents the $i^{th}$ element of the vector of variable (to be determined by optimization)
n represents the number of basis functions.

The output signal z to be regulated can be written as function of time in the way as expressed in equitation (4):

$$z(t) = \sum_{i=1}^{n} \theta_i \cdot z_i(t)\qquad\text{Eq. (4)}$$

or in the form of equitation (5)

$$z(t) = L^{-1}\{Z(s)\}\qquad\text{Eq. (5)}$$

with $$Z(s) = \sum_{i=1}^{n} \theta_i \cdot Z_i(s).\qquad\text{Eq. (6)}$$

and $$Z_i(s) = P(s) \cdot H_i(s) \cdot U(s)\qquad\text{Eq. (7)}$$

Therein:
z(t) represents the regulated output time signals,
$z_i(t)$ represents the $i^{th}$ regulated output time signal,
Z(s) represents the Laplace transformation of regulated output signals,
$Z_i(s)$ represents the Laplace transformation of $i^{th}$ regulated output signal, and
$L^{-1}$ represents the Laplace inverse transformation,
P(s) stands for the response of the augmented plant
U(s) stands for the influence by the inputs By methods known in the convex optimization, the vector of variable is determined from the above-mentioned equations according to expressions (8) and (9):

$$\min_{\theta}[c^T \cdot \theta]\qquad\text{Eq. (8)}$$

$$A \cdot \theta \leq b.\qquad\text{Eq. (9)}$$

Therein,
c represents linear program objective function coefficients, and
A, b define linear program constrains.

In one example, the convex optimization is conducted such that z(t) is minimized.

Figure 5:
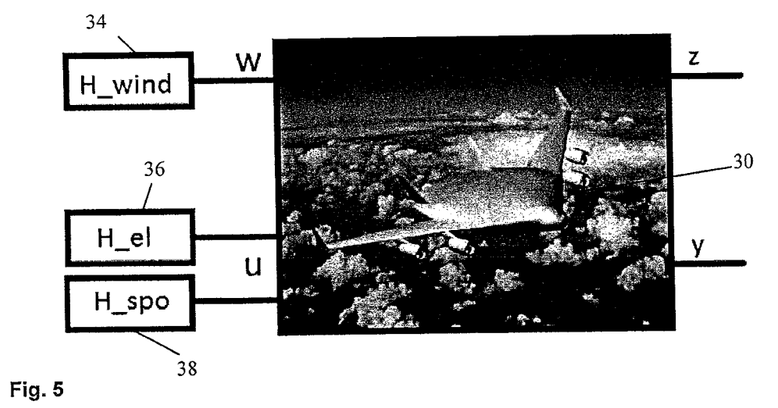
FIG. 5 shows the application of the general augmented plant plot of FIG. 4 to a special aircraft for explaining a set-up used for optimization signals generation wherein wind gust signal and elevator and spoiler basis function generators are used one by one to generate responses of the whole system.

This generally explained principle of finding an optimized feed-forward control law can be conducted to find an optimized control command sequence for gust alleviation in an aircraft as indicated in FIG. 5. FIG. 5 shows the set up used for convex optimization of command signal sequences of the aircraft 30.

The aircraft 30 shown in this example of FIG. 5 is a blended wing body aircraft BWB, but this is just a non-limiting example.

Inputs for the convex optimization are
H_wind representing signals of a wind gust signal generator (e.g. a gust signal simulation means 34),
H_el representing signals of an elevator basis function generator 36 generating a basis function for an elevator command signal,
H_spo representing signals of a spoiler basis function generator 38 generating a basis function for a spoiler command signal.

In a preferred embodiment, a wind gust signal H_wind is provided by a gust signal simulation means 34, an elevator basis function generator 36 provides a basis function for the elevation command signal, and a spoiler basis function generator 38 provides a basis function for the spoiler command signal.

Using this definitions of FIG. 5 and referring again to FIG. 4, the aircraft 30 is then the augmented plant P, the exogenous inputs w represent the disturbances due to gust, and z are the outputs to be optimized, for example minimized load responses such as wing root bending moments or wing root torque moments. $U_{ref}$ is given, for example, by $\alpha_{wind}$ obtained as mentioned above, and the feed-forward control law H is contained in the gust load alleviation apparatus 10 providing the control command sequences 24, 26 as actuator feed-forward inputs $U_{FF}$. y are outputs of flight sensors such like a pitch rate sensor or a vertical acceleration sensor to be input in a flight controller 32 providing the actuator feed-back inputs $U_{FB}$ according to the feedback control law K.

The aim is to reduce the absolute values of the maximum and minimum loads (z) excited by a gust. This is conducted using basis functions from the elevator basis function generator 36 and the spoiler basis function generator 38.

Figure 6:
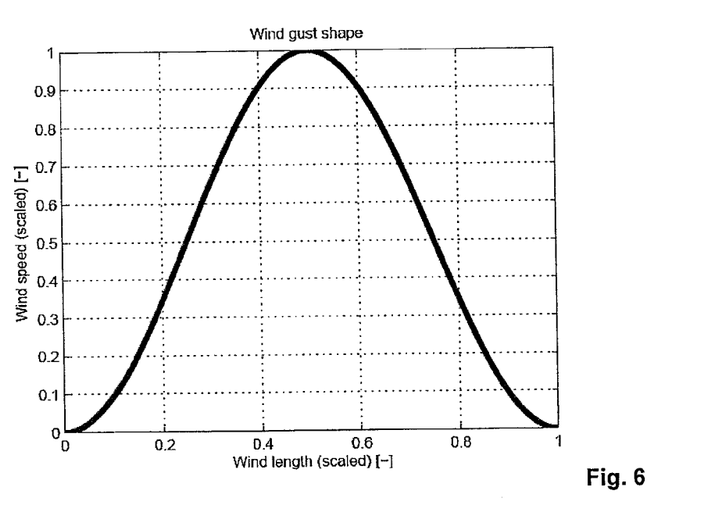
FIG. 6 shows a diagram of a wind gust signal generated by H_wind in FIG. 5.

Referring to FIG. 6, there is shown a typical wind gust signal H_wind generated by the gust signal simulation means 34 of FIG. 5. In the following, there is explained how optimized control command sequences for alleviating loads induced by such a gust are obtained.

Figure 7:
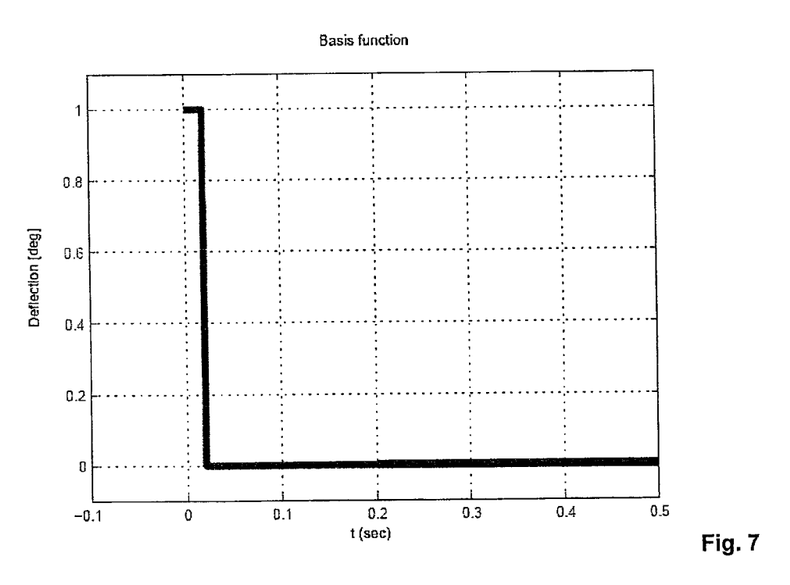
FIG. 7 shows an example of a basis function used as elevator and spoiler input signal generated by H_el and H_spo in FIG. 5.

For achieving this, an appropriate basis function is used, such as shown in FIG. 7. FIG. 7 shows an elevator and spoiler input signal generated by the elevator basis function generator 36 and by the spoiler basis function generator 38 of FIG. 5. Both inputs signals are given as an impulse function. This shape is used to consider a discrete impulse response optimization.

In the present embodiment, the aim is to design a control command sequence determining device 40 (for example an elevator and/or spoiler input shaper/signal generator) with impulse response designed by convex optimization.

The basis function as indicated in FIG. 7 are input in the simulation model of the aircraft 30, as illustrated in FIG. 5 and represented by the augmented plant P in FIG. 4. Thus, a load response as response to the basis function is determined. For example, the response of the wing root bending moment signal Mx to the input of the basis function as H_spo is determined as $z_i(t)$.

A signal Mx shown in the figures represents a wing root bending moment. A signal My shown in the figures represents a wing root torsion moment.

Figure 8:
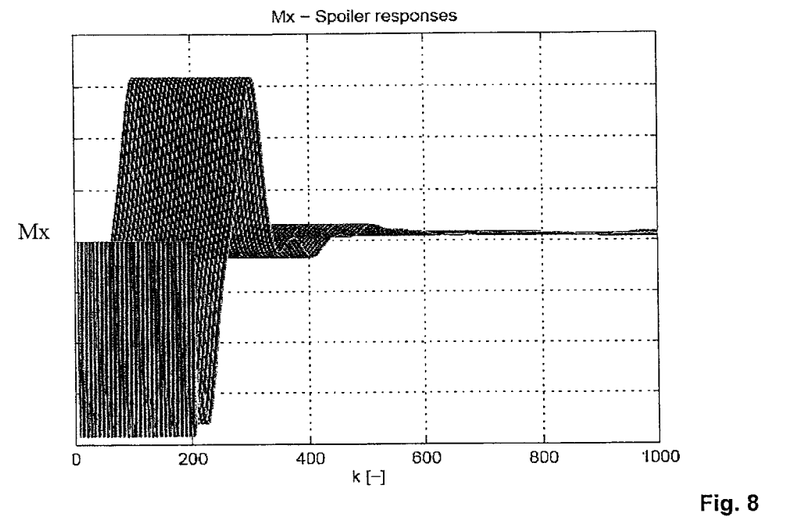
FIG. 8 shows a graph of a response of a wing root bending moment signal Mx (Mx response) for a series of impulses in spoiler input.
Figure 9:
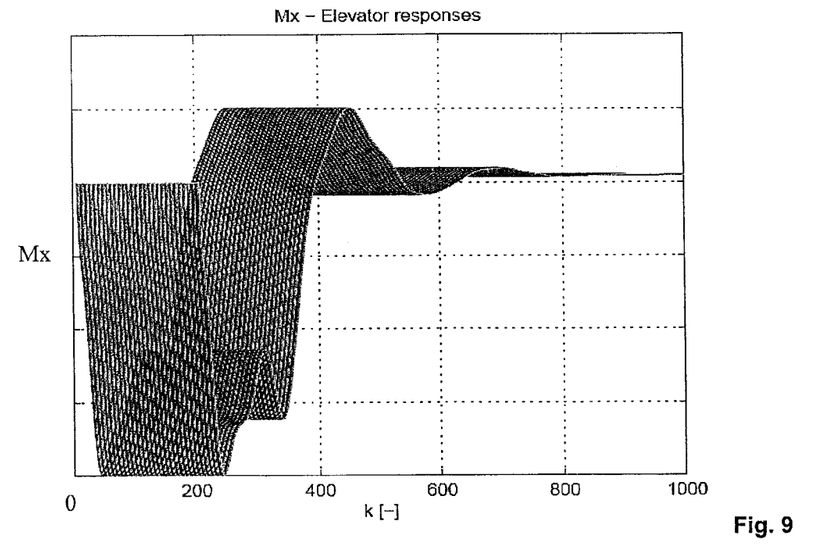
FIG. 9 shows a graph for a response of the wing root bending moment signal Mx (Mx response) for a series of impulses in elevator input.

FIG. 8 shows the Mx response for series of impulses in spoiler input. The series of impulses is generated during discrete times. For example, a series of n=200 impulses are generated as spoiler input, e.g. one impulse per millisecond. This leads to a series of n=200 Mx responses illustrated in FIG. 8. FIG. 9 shows similar to FIG. 8 a series of Mx response for a series of impulses in elevator input.

Thus, for optimizing the spoiler control command signal, Mx is considered as z(t) in Eq. (4) wherein the Mx impulse response for the $i^{th}$ impulse generated at the discrete time $t=t_i$ is considered as $z_i(t)$. Then the vector of variable θ is determined by optimization. The same is conducted for optimizing the elevator control signal.

Figure 10:
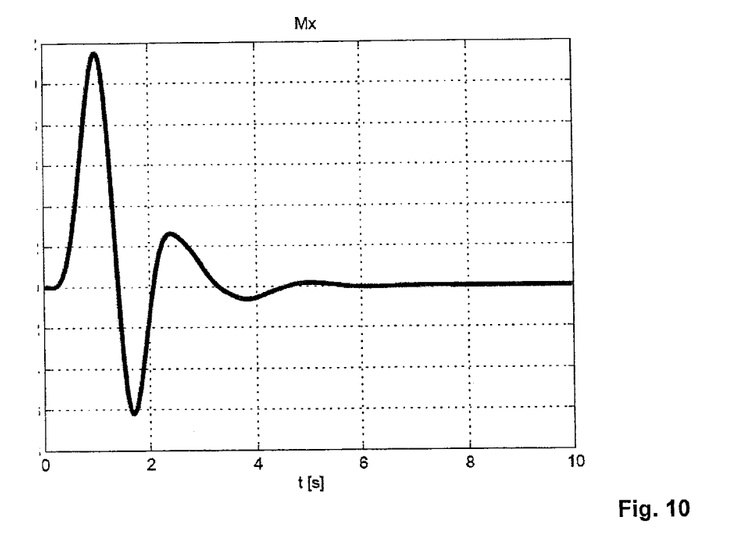
FIG. 10 shows the Mx response for wing gust input which is a reference signal as response of uncontrolled system.

FIG. 10 shows the Mx response for a wind gust input, i.e. when the wind gust shape of FIG. 3 is given as input. This is a reference signal as a response of the uncontrolled system. The aim is to minimize the absolute values at least for the first and the second peaks.

The impulse response optimization is done based on convex optimization over discrete time series. The response of the system for basis functions, see FIGS. 7 to 9 is considered together with a typical disturbance input signal shape, see FIGS. 6 and 10. A considered criterion is minimization of $L_{inf}$-norm of Mx responses and of My responses (wherein My represents a wing root torque moment signal) with constrains for actuator saturations and rate limits. A linear program can be involved in this particular case to solve the problem, see Eq. (8) and (9).

Figure 11:
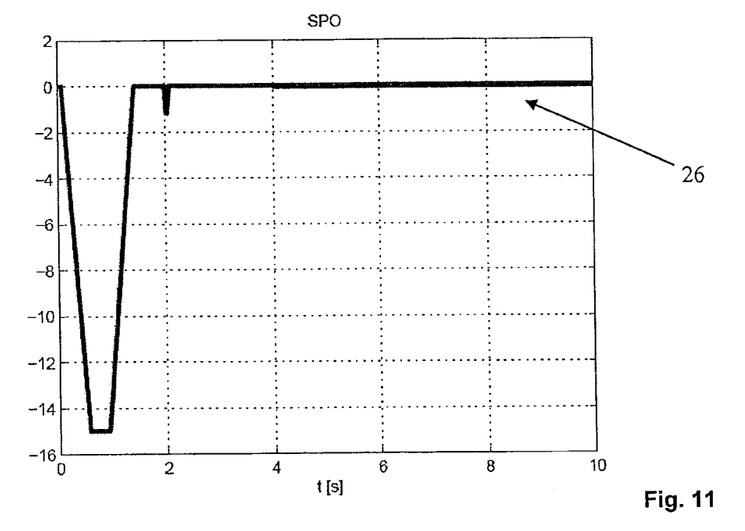
FIG. 11 shows a graph of an impulse response of a spoiler shaper that represents the optimal spoiler command sequence for minimization of wing load during wind gust.

FIG. 11 shows the impulse optimal spoiler command sequence achieved by this optimization. The spoiler command sequence H is achieved by applying the determined vector of variable θ to the model of the control sequence according $$H = \sum_{i=1}^{n} \theta_i \cdot H_i$$

wherein $H_i$ is the impulse function at the time $t_i$. Thus, FIG. 11 shows the impulse response of the spoiler command sequence determination means.

Figure 12:
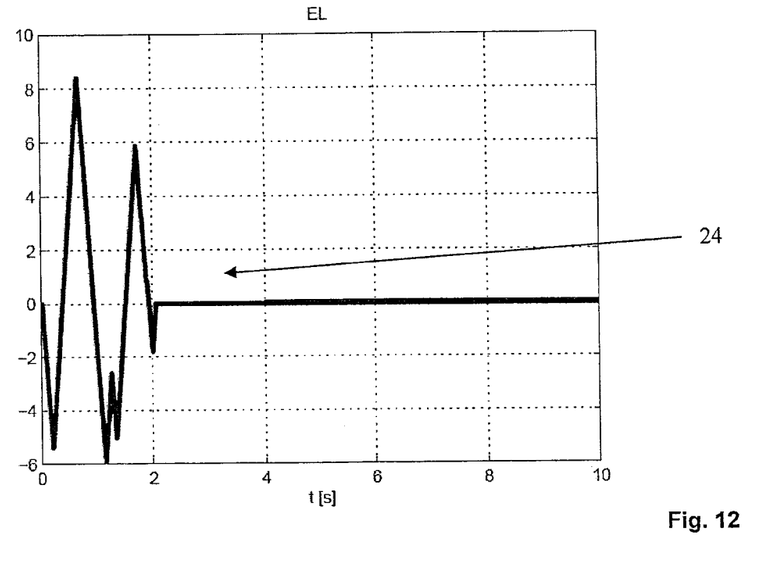
FIG. 12 shows a graph similar as in FIG. 11, but here the impulse response of an elevator shaper is presented.

FIG. 12 shows the similar situation as in FIG. 11, but in this case the impulse response of the elevator command sequence determination means is presented.

Figure 13:
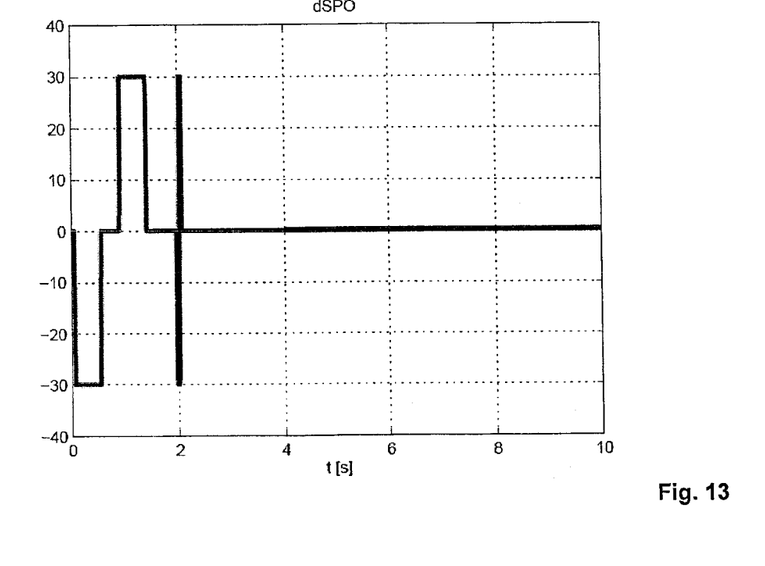
FIG. 13 shows a graph of a spoiler deflection rate usable to prove actuators' rate limits constraints.
Figure 14:
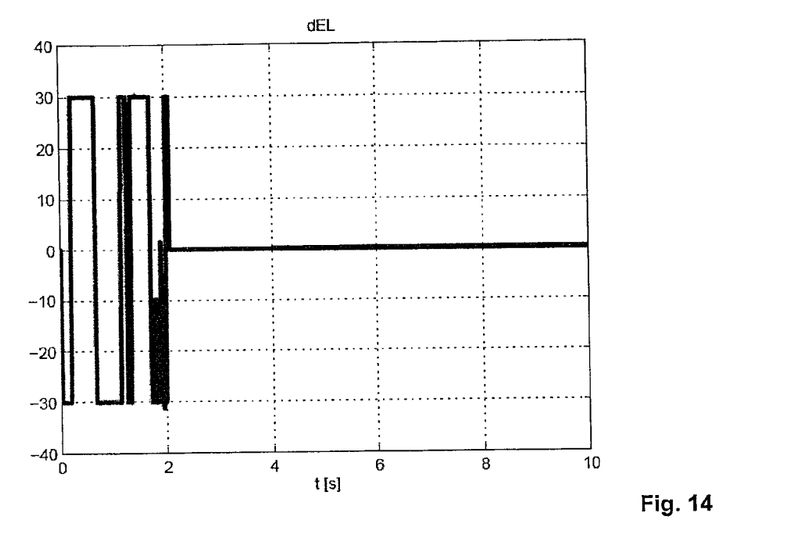
FIG. 14 shows a graph of an elevator deflection rate usable to prove actuators' rate limits constraints.

In FIGS. 13 and 14 spoiler and elevator deflection rates are presented to prove sensor rate limits constraints. Such constraints can be considered by Eq. (8) and (9).

Figure 15:
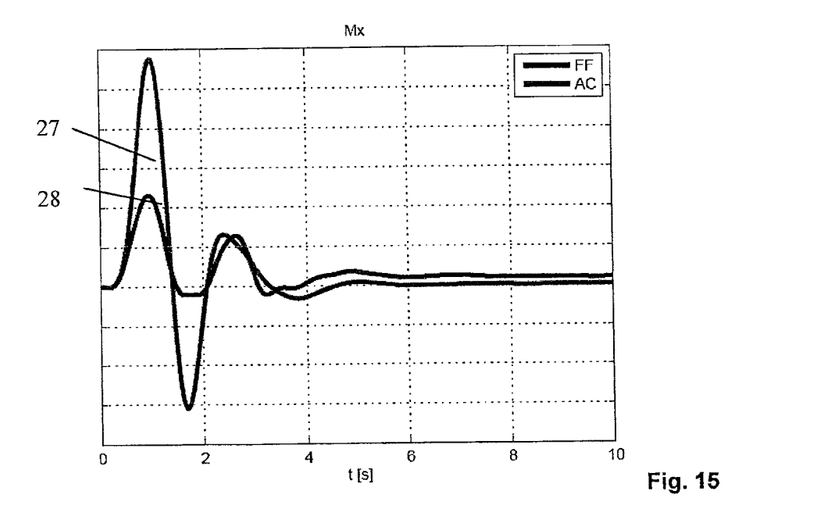
FIG. 15 shows a graph of the wing root bending moment signal Mx comparing a control-free ("control-free" means here free of gust load control; there may be a feedback control system, for example flight controller) aircraft with the gust load alleviation system.
Figure 16:
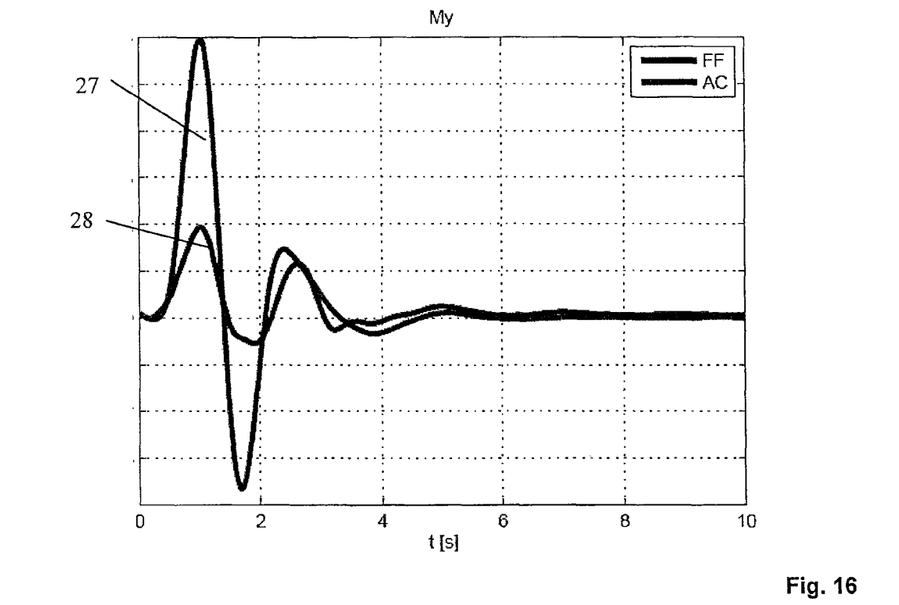
FIG. 16 shows a graph for the wing root torque moment signal My comparing a control-free (for "control-free", see above) aircraft with the gust load alleviation system.
Figure 17:
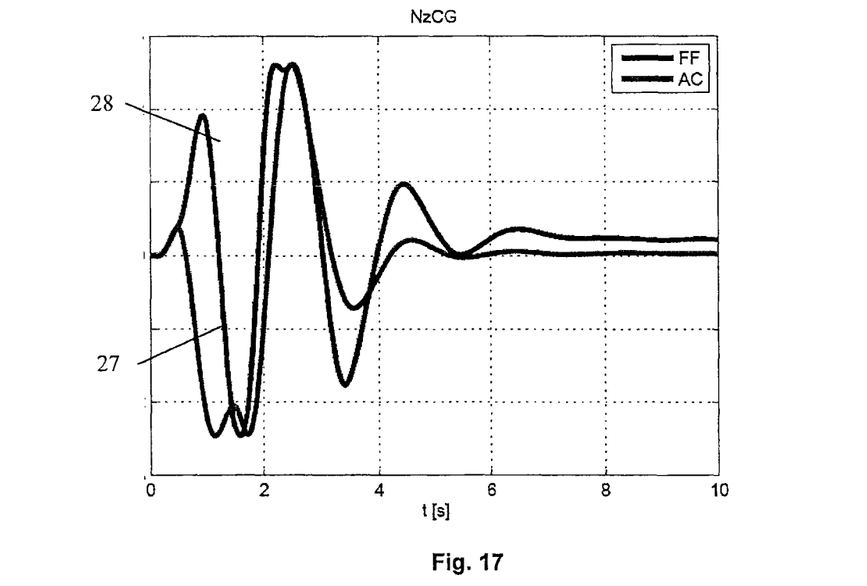
FIG. 17 shows a graph of the normal acceleration in centre of gravity signal comparing a control-free (for "control-free", see above) aircraft with the gust load alleviation system.

FIG. 15 shows a graph of the Mx signal without gust load alleviation and with gust load alleviation according to the method as explained above. FIG. 16 shows a similar graph for the My signal. FIG. 17 shows the similar situation for the normal acceleration at centre of gravity (NzCG).

The optimized control commands sequences can be determined once when designing or testing a type of an aircraft 30, and can be stored in the memory device of the gust load alleviation apparatus 10 of each aircraft of this type.

Both the gust load alleviation apparatus 10 and the control command determining device 30 can be implemented as software in appropriate data processing devices.

The combination of the control command determining device 30 and the gust load alleviation apparatus provides a gust load alleviation system that is indicated at 50 in FIG. 4 and that is configured to determine an optimized control command sequence and to use that control command sequence for actuating control surfaces in a prescribed dynamic way for alleviating loads induced by disturbance of gusts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 Gust load alleviation apparatus
12 Monitoring means
14 Control command generation means
16 Reference sensor
18 Alpha probe
20 excitation identification means
22 comparing means
23 memory device
24 predetermined command sequence for elevator command signal
26 predetermined command sequence for spoiler command signal
27 first line (without gust load alleviation)
28 second line (with gust load alleviation)
30 aircraft
32 flight controller
34 gust signal simulation means
36 elevator basis function generator
38 spoiler basis function generator
40 control command determining device
50 gust load alleviation system

The invention claimed is:

1. A method of dynamically alleviating loads generated on an aircraft by a disturbance of gust, the method comprising the steps of:
   automatically detecting a disturbance due to gust on a flight of the aircraft;
   automatically generating control commands for control surfaces when a disturbance due to gust is detected;
   applying the control commands to actuate the control surfaces;
   dynamically actuating the control surfaces in a prescribed dynamic way in order to minimize both a first load peak and a second load peak; and
   generating control commands using a predetermined control command sequence that has been pre-determined in a previous control command sequence determining step,
   wherein the control command sequence determining step comprises:
      determining a load response of the aircraft in response to an actuation of the control surface according to a basis function $H_i$,
      modelling the control command sequence as a linear combination of basis functions in the form of $$H = \sum_{i=1}^{n} \theta_i \cdot H_i$$

wherein $\theta_i$ represents the $i^{th}$ element of a vector of variable θ,
simulating a typical wind gust shape being alleviated by the control command sequence H, and determining the vector of variable θ by optimization calculation such that the load response to the typical wind gust shape is minimized.

2. The method according to claim 1, wherein the control command sequence determining step comprises:
   determining an optimized control command sequence in a convex synthesis.

3. The method according to claim 1, wherein the basis function is an impulse function and the load response is a load response in response to an impulse.

4. The method according to claim 1, wherein the optimization calculation is performed over discrete time series, wherein $H_i$ represents the basis function for the discrete time $t_i$ of a series of discrete times $t_1 \ldots t_i \ldots t_n$.

5. The method according to claim 1, further comprising:
   storing the control command sequence determined in the control command sequence determining step in a memory device,
   wherein the step of generating the control commands comprises reading out the memory device for generating the predetermined control command sequence.

6. The method according to claim 1, wherein the control commands are chosen of the following group of control commands:
   elevator control commands for actuating an elevator control surface,
   spoiler control commands for deflecting spoiler control surfaces arranged on an upper and/or lower surface of a wing of the aircraft, and
   aileron control commands for actuating an aileron control surface.

7. An apparatus for dynamically alleviating loads generated on an aircraft by a disturbance of gust, comprising:
   a monitor configured to automatically detect a disturbance due to gust;
   control command generator configured to automatically generate control commands for an actuating of control surfaces when said disturbance due to gust is detected, wherein the control command generator is configured to dynamically actuate the control surfaces in a prescribed dynamic way in order to minimize both a first load peak and a second load peak; and
   a control command sequence determining device configured to determine a control command sequence to be used as the control commands, the control command sequence determining device comprising
      a load response determiner configured to determine a load response of the aircraft in response to an actuation of the control surface according to a basis function $H_i$,
      a modeller configured to model the control command sequence as a linear combination of basis functions in the form of $$H = \sum_{i=1}^{n} \theta_i \cdot H_i$$

wherein $\theta_i$ represents the $i^{th}$ element of a vector of variable θ,
      a gust signal simulator configured to simulate a typical wind gust shape to be alleviated by the control command sequence H, and
      a determiner configured determine the vector of variable θ by optimization calculation such that the load response to the typical wind gust shape is minimized.

8. The apparatus according to claim 7, wherein the control command generator comprises a memory device containing a predetermined control command sequence.

9. The apparatus according to claim 7, wherein the load response determiner is configured to use an impulse function as the basis function and is configured to determine a load response in response to an impulse.

10. The apparatus according to claim 7, wherein the control command sequence determining device is configured to calculate the optimization over discrete time series, wherein $H_i$ represents the basis function for the discrete time $t_i$ of a series of discrete times $t_1 \ldots t_i \ldots t_n$.

* * * * *